United States Patent
Watanabe et al.

(10) Patent No.: US 12,246,704 B2
(45) Date of Patent: Mar. 11, 2025

(54) PARKING ASSISTANCE METHOD AND PARKING ASSISTANCE DEVICE

(71) Applicant: Nissan Motor Co., Ltd., Yokohama (JP)

(72) Inventors: Takeshi Watanabe, Kanagawa (JP); Yasuhiro Suzuki, Kanagawa (JP); Muku Takeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/713,020

(22) PCT Filed: Nov. 30, 2021

(86) PCT No.: PCT/JP2021/043811
§ 371 (c)(1),
(2) Date: May 23, 2024

(87) PCT Pub. No.: WO2023/100230
PCT Pub. Date: Jun. 8, 2023

(65) Prior Publication Data
US 2025/0018933 A1  Jan. 16, 2025

(51) Int. Cl.
*B60W 30/00* (2006.01)
*B60W 30/06* (2006.01)
(Continued)

(52) U.S. Cl.
CPC ......... *B60W 30/06* (2013.01); *G01C 21/3667* (2013.01); *G06T 7/20* (2013.01);
(Continued)

(58) Field of Classification Search
CPC ... B60W 30/06; B60W 2420/403; G06T 7/70; G06T 7/20; G06T 2207/30241;
(Continued)

(56) References Cited

U.S. PATENT DOCUMENTS 10,442,464 B2 * 10/2019 Numata ............... B62D 15/028
10,679,072 B2    6/2020 Fujita
(Continued)

FOREIGN PATENT DOCUMENTS

JP   2009-159241 A   7/2009
JP   2017-138664 A   8/2017
(Continued)

*Primary Examiner* — Tiffany P Young
(74) *Attorney, Agent, or Firm* — Young Basile Hanlon & MacFarlane, P.C.

(57) ABSTRACT

A parking assistance method includes: detecting, from an image of surroundings of a vehicle, a first target object position; detecting a first image capturing situation when the image is captured; with respect to a second target object position of a target object detected from a past image of surroundings of a target parking position in a past, retrieving one or more combinations of a relative positional relationship between the second target object position and the target parking position and a second image capturing situation when the past image is captured; selecting, the relative positional relationship combined with the second image capturing situation having a difference from the first image capturing situation less than or equal to a predetermined difference; and calculating, based on the selected relative positional relationship and the first target object position, a relative position between a current position of the vehicle and the target parking position.

6 Claims, 4 Drawing Sheets

(51) Int. Cl.
  *G01C 21/36* (2006.01)
  *G06T 7/20* (2017.01)
  *G06T 7/70* (2017.01)

(52) U.S. Cl.
  CPC ......... *G06T 7/70* (2017.01); *B60W 2420/403* (2013.01); *G06T 2207/30241* (2013.01); *G06T 2207/30261* (2013.01); *G06T 2207/30264* (2013.01)

(58) Field of Classification Search
  CPC ........... G06T 2207/30261; G06T 2207/30264; G01C 21/3667
  USPC ......................................................... 701/25
  See application file for complete search history.

(56) References Cited

U.S. PATENT DOCUMENTS

| | | | |
|---|---|---|---|
| 10,953,869 | B2 | 3/2021 | Iio et al. |
| 2018/0225524 | A1 | 8/2018 | Fujita |
| 2019/0039605 | A1 | 2/2019 | Iio et al. |

FOREIGN PATENT DOCUMENTS

| | | |
|---|---|---|
| JP | 2018-128314 A | 8/2018 |
| JP | 2020-192905 A | 12/2020 |

\* cited by examiner

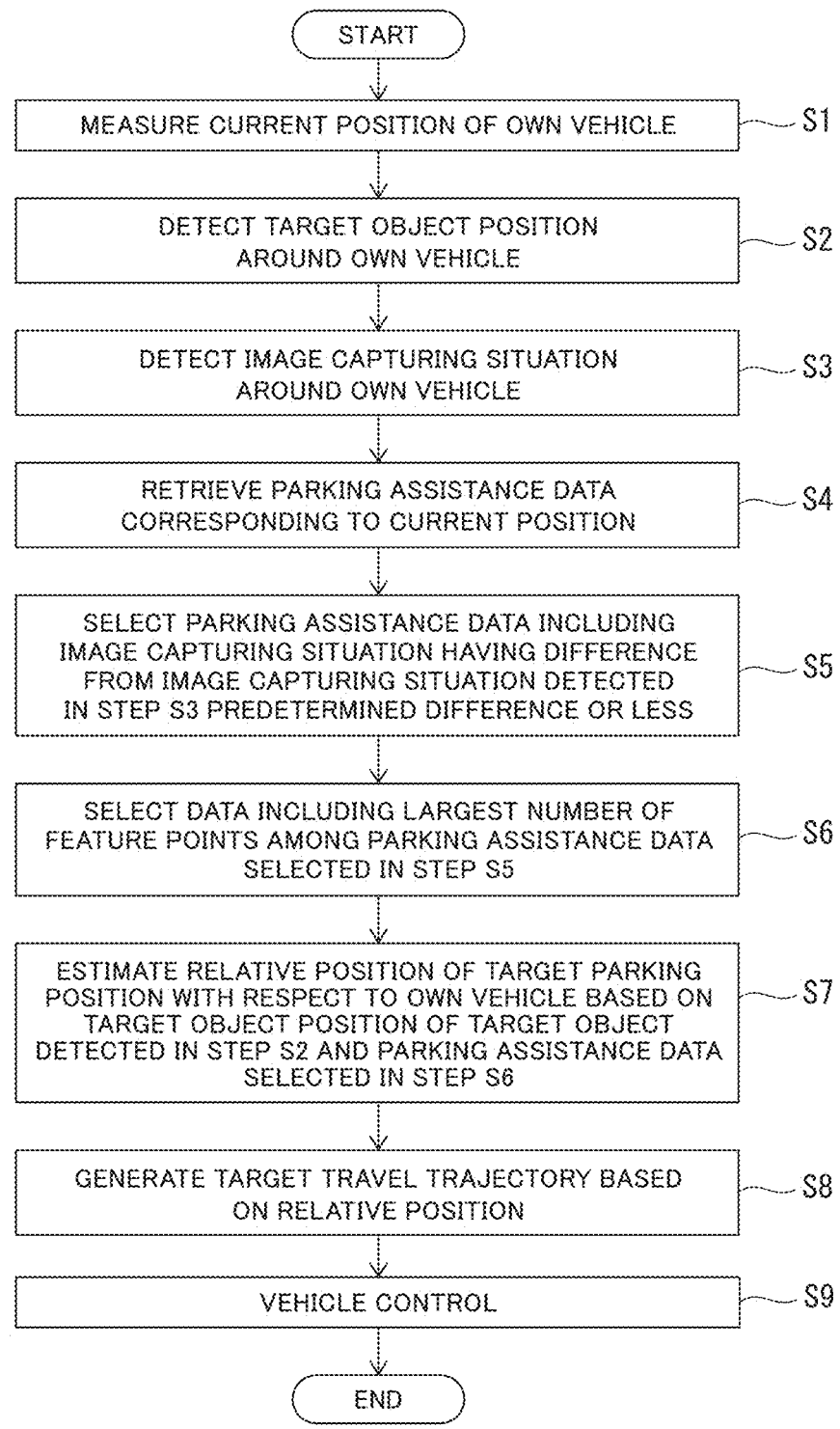

PARKING ASSISTANCE METHOD AND PARKING ASSISTANCE DEVICE

TECHNICAL FIELD

The present invention relates to a parking assistance method and a parking assistance device.

BACKGROUND

As a technology relating to parking assistance to assist parking of an own vehicle at a target parking position, JP 2017-138664 A described below has been known. In JP 2017-138664 A, a target object is detected from an image in which surroundings of a target parking position is captured in the past and stored, a relative position of the target parking position with respect to the own vehicle is calculated based on a position of the stored target object and a position of a target object detected from an image in which surroundings of the own vehicle is captured at the time of autonomous parking, and the own vehicle is caused to autonomously move to the target parking position, based on the calculated relative position.

SUMMARY

However, a target object detected from an image changes depending on an image capturing situation. Therefore, when an image capturing situation when a stored target object was detected in the past and an image capturing situation at the time of parking assistance are different from each other, there is a risk that precision of the parking assistance deteriorates.

An object of the present invention is to, in parking assistance to assist parking of an own vehicle at a target parking position based on a target object position detected from a captured image, suppress precision of the parking assistance from being reduced due to a change in an image capturing environment of a captured image.

According to an aspect of the present invention, there is provided a parking assistance method including: detecting, from an image acquired by capturing surroundings of an own vehicle, a first target object position, the first target object position being a position of a target object around the own vehicle; detecting a first image capturing situation, the first image capturing situation being an image capturing situation when the image is captured; with respect to a second target object position, the second target object position being a target object position of a target object detected from a past image, the past image being an image acquired by capturing surroundings of a target parking position in a past, retrieving, from a predetermined storage device in which one or more combinations of a relative positional relationship between the second target object position and the target parking position and a second image capturing situation, the second image capturing situation being an image capturing situation when the past image is captured, are stored, one or more combinations of the relative positional relationship and the second image capturing situation; selecting, among the retrieved relative positional relationships, the relative positional relationship stored in combination with the second image capturing situation having a difference from the first image capturing situation less than or equal to a predetermined difference; and calculating, based on the selected relative positional relationship and the first target object position, a relative position between a current position of the own vehicle and the target parking position and performing parking assistance of the own vehicle at the target parking position.

According to an aspect of the present invention, it is possible to, in parking assistance to assist parking of an own vehicle at a target parking position based on a target object position detected from a captured image, suppress precision of the parking assistance from being reduced due to a change in an image capturing environment of a captured image.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 7 is a flowchart of an example of the parking assistance method of the embodiment.

DETAILED DESCRIPTION (Configuration)

Figure 1:
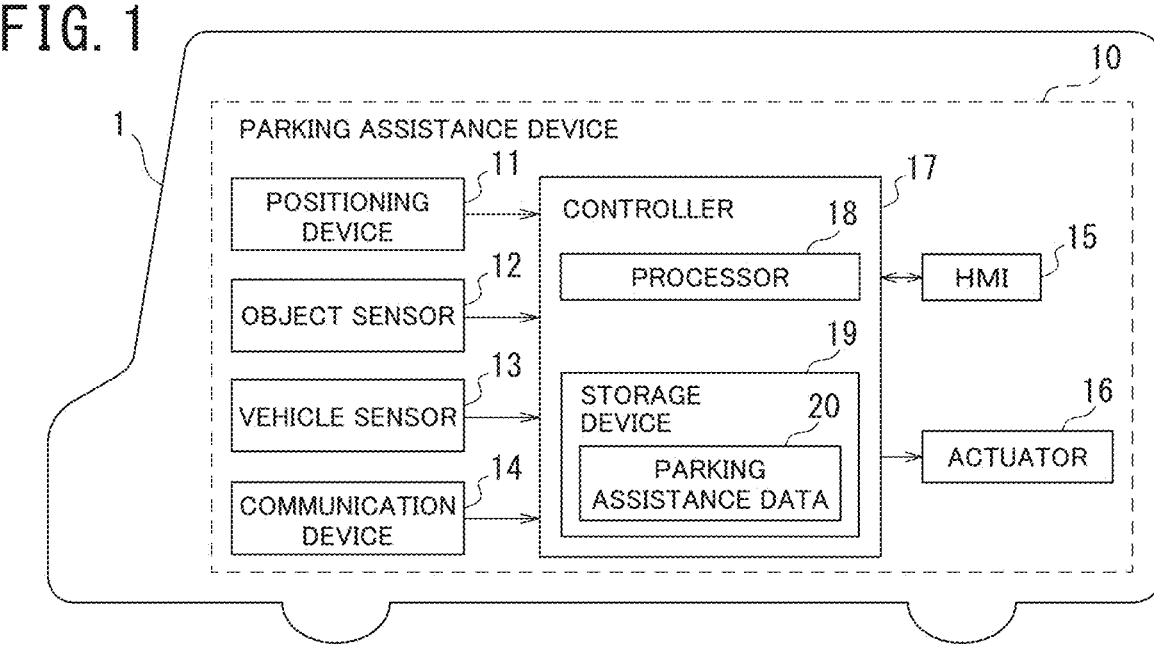
FIG. 1 is a diagram illustrative of an example of a schematic configuration of a parking assistance device of an embodiment.

FIG. 1 is a diagram illustrative of an example of a schematic configuration of a parking assistance device of an embodiment. An own vehicle 1 includes a parking assistance device 10 configured to assist parking of the own vehicle 1 at a target parking position. In parking assistance performed by the parking assistance device 10, a target travel trajectory from a current position of the own vehicle 1 to the target parking position is calculated. In the parking assistance, the parking assistance device 10 assists the own vehicle 1 in traveling along the target travel trajectory.

In parking assistance performed by the parking assistance device 10, various forms of assisting the own vehicle 1 in traveling along the target travel trajectory are included. For example, the parking assistance device 10 may, by performing autonomous driving to control the own vehicle to travel to the target parking position along the target travel trajectory of the own vehicle 1, assist parking of the own vehicle 1. Note that the autonomous driving to control the own vehicle 1 to travel to the target parking position along the target travel trajectory of the own vehicle 1 means control to control all or some of a steering angle, a driving force, and a braking force of the own vehicle, autonomously perform all or a portion of travel along the target travel trajectory of the own vehicle 1, and thereby assist parking operation of a passenger.

In addition, for example, the parking assistance device 10 may, by displaying the target travel trajectory and the current position of the own vehicle 1 on a display device that the passenger of the own vehicle 1 can visually recognize and thereby facilitating the passenger of the own vehicle 1 performing driving operation in such a way that the own vehicle 1 travels along the target travel trajectory, assist parking of the own vehicle 1.

The parking assistance device 10 includes a positioning device 11, an object sensor 12, vehicle sensors 13, a communication device 14, human-machine interfaces 15, actuators 16, and a controller 17. In the drawings, the human-machine interface is referred to as "HMI".

The positioning device 11 measures a current position of the own vehicle 1. The positioning device 11 may include, for example, a global navigation satellite system (GNSS) receiver. The GNSS receiver is a global positioning system (GPS) receiver and receives radio waves from a plurality of navigation satellites and thereby measures the current position of the own vehicle 1.

The object sensor 12 detects an object in a predetermined distance range from the own vehicle 1 (for example, a detection range of the object sensor 12). The object sensor 12 detects a surrounding environment around the own vehicle 1, such as a relative position between an object existing in surroundings around the own vehicle 1 and the own vehicle 1, distance between the own vehicle 1 and the object, and a direction in which the object exists. The object sensor 12 may include, for example, a camera to capture the surrounding environment around the own vehicle 1. The camera may be, for example, an around view monitoring camera that captures images of the surroundings around the own vehicle 1 and generate captured images to be converted to a bird's eye view (around view monitoring image). The object sensor 12 may include a ranging device, such as a laser range finder (LRF), a radar, or a laser radar like a light detection and ranging (LiDAR).

The vehicle sensors 13 detect various information (vehicle information) that can be acquired from the own vehicle 1. The vehicle sensors 13 include, for example, a vehicle speed sensor configured to detect traveling speed (vehicle speed) of the own vehicle 1, wheel speed sensors configured to detect rotational speed of respective tires that the own vehicle 1 has, a triaxial acceleration sensor (G sensor) configured to detect acceleration (including deceleration) in three axial directions of the own vehicle 1, a steering angle sensor configured to detect a steering angle of a steering wheel, a turning angle sensor configured to detect a turning angle of steered wheels, a gyro sensor configured to detect angular velocity generated in the own vehicle 1, and a yaw rate sensor configured to detect a yaw rate.

The communication device 14 performs wireless communication with a communication device external to the own vehicle 1. A communication method used by the communication device 14 may be, for example, wireless communication via a public mobile communication network, vehicle-to-vehicle communication, road-to-vehicle communication, or satellite communication.

The human-machine interfaces 15 are interface devices that give and receive information between the parking assistance device 10 and the passenger. The human-machine interfaces 15 include a display device (such as a display screen of a navigation system and a display device installed close to a meter in front of a driver seat) that the passenger of the own vehicle 1 can visually recognize and a speaker or a buzzer that outputs an alarm sound, a notification sound, or voice information. The human-machine interfaces 15 also include an operation element configured to accept an operation input by the passenger to the parking assistance device 10. For example, the operation element may be a button, a switch, a lever, a dial, a keyboard, a touch panel, or the like.

The actuators 16 include a steering actuator, an accelerator actuator, and a brake control actuator. The steering actuator controls a steering angle of a steering mechanism of the own vehicle 1 in accordance with a control signal from the controller 17. The accelerator actuator controls accelerator opening of a drive device, which is an engine or a drive motor, in accordance with a control signal from the controller 17. The brake actuator causes a braking device to operate in accordance with a control signal from the controller 17.

The controller 17 is an electronic control unit (ECU) that performs parking assistance control of the own vehicle 1. The controller 17 includes a processor 18 and peripheral components, such as a storage device 19.

The processor 18 may be, for example, a central processing unit (CPU) or a micro-processing unit (MPU).

The storage device 19 may include a semiconductor storage device, a magnetic storage device, an optical storage device, and the like. The storage device 19 may include registers, a cache memory, and a memory, such as a read only memory (ROM) or a random access memory (RAM), that is used as a main storage device. Functions of the controller 17, which will be described below, may be achieved by, for example, the processor 18 executing computer programs stored in the storage device 19.

Note that the controller 17 may be formed using dedicated hardware for performing various types of information processing that will be described below. For example, the controller 17 may include a functional logic circuit that is implemented in a general-purpose semiconductor integrated circuit. For example, the controller 17 may include a programmable logic device (PLD), such as a field-programmable gate array (FPGA), and the like.

Figure 2:
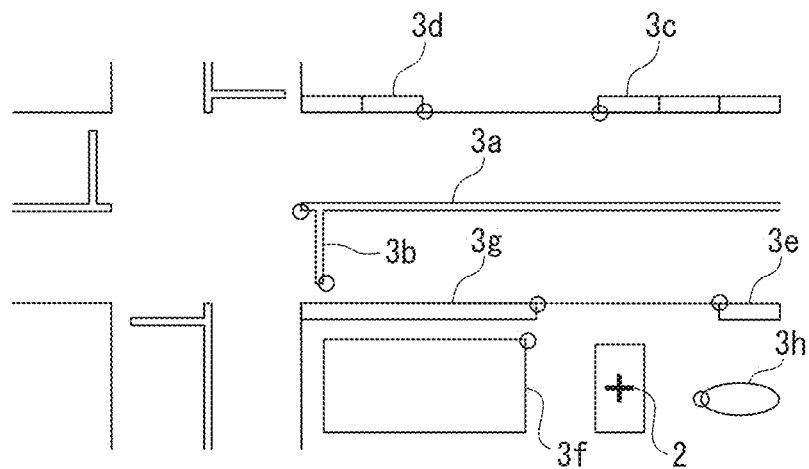
FIG. 2 is a schematic diagram of target object positions around a target parking position.

Next, an example of the parking assistance control performed by the parking assistance device 10 will be described. FIG. 2 is now referred to. When use of the parking assistance performed by the parking assistance device 10 is started, first, a relative positional relationship between a target object position of a target object existing around a target parking position 2 and the target parking position 2 is stored in the storage device 19. In this configuration, the target parking position 2 is a target position at which the own vehicle 1 is to be parked. The target object is a ground object serving as a mark for specifying the current position of the own vehicle 1. The target object may be, for example, a pavement marking (a lane boundary line 3a, a stop line 3b, a road sign, or the like), a road boundary (curbs 3c to 3e, a guardrail, or the like), or an obstacle (a house 3f, a wall 3g, an objet 3h, or the like).

When a relative positional relationship between a target object position and the target parking position 2 is first stored in the storage device 19, an operation mode of the parking assistance device 10 is set to a "target object learning mode". Subsequently, the own vehicle 1 is parked at the target parking position 2 by manual driving. When the own vehicle 1 is to be parked at the target parking position 2 by manual driving, the parking assistance device 10 may automatically set the operation mode to the "target object learning mode".

While the own vehicle 1 is moved to be parked at the target parking position 2 by manual driving, a target object position of a target object around the own vehicle 1 is detected by the object sensor 12. The object sensor 12 is a sensor to detect a target object position existing in a detection region within a predetermined detection distance range from the object sensor 12.

For example, the parking assistance device 10 may detect edge portions or corner portions of target objects, such as pavement markings (in the example in FIG. 2, the lane boundary line 3a and the stop line 3b), road boundaries (in the example in FIG. 2, ground contacting portions of the curbs 3c to 3e), and obstacles (in the example of FIG. 2, ground contacting portions of the house 3f, the wall 3g, and the objet 3h), in a captured image obtained by image capturing using the camera of the object sensor 12, as feature points and define positions of the feature points as target object positions.

Further, the parking assistance device 10 calculates a feature amount of a detected feature point (for example, a shade, an attribute, or the like of the feature point). For detection of a feature point and calculation of a feature amount, various methods, such as SIFT, SURF, ORB, BRIAK, KAZE, and AKAZE, can be made use of. Note that the detection of a feature amount of a feature point is not essential and it is only required to detect at least the position of a feature point.

Next, the parking assistance device 10 calculates a relative positional relationship between a target object position (the position of a feature point) detected by the object sensor 12 and the target parking position 2. For example, the parking assistance device 10 calculates, based on a position of a feature point in an image and camera information relating to an attachment state (an attachment position, an optical axis angle, and an angle of view) of the camera to the own vehicle 1, a relative position of the feature point with respect to the own vehicle 1. Next, the parking assistance device 10 estimates a current position of the own vehicle 1 in a fixed coordinate system at a time point at which a target object position is detected by the object sensor 12 and calculates, based on the estimated current position and the relative position of the target object with respect to the own vehicle 1, a target object position in the fixed coordinate system. As used herein, the fixed coordinate system is a coordinate system with the origin set at a specific point (for example, a map coordinate system).

The current position of the own vehicle 1 in the fixed coordinate system may be estimated by, for example, the positioning device 11, odometry, or dead reckoning. The current position of the own vehicle 1 in the fixed coordinate system may be estimated by map mapping between a target object position detected by the object sensor 12 and a known target object position or high-definition map information.

Next, the parking assistance device 10 identifies the target parking position 2 in the fixed coordinate system. For example, the parking assistance device 10 may detect a position of the own vehicle 1 when the own vehicle 1 is positioned at the target parking position 2, as the target parking position 2. The target object position and the position of the target parking position 2 being determined in the fixed coordinate system causes a relative positional relationship between the target object position and the target parking position 2 to be determined.

The parking assistance device 10 stores a relative positional relationship between a target object position and the target parking position 2 in the storage device 19. For example, the parking assistance device 10 may individually store a target object position and the position of the target parking position 2 in the fixed coordinate system in the storage device 19. Alternatively, the parking assistance device 10 may calculate a target object position in a relative coordinate system with the origin set at the target parking position 2 and store the calculated target object position in the storage device 19. In the following description, an example in which the parking assistance device 10 stores a target object position and the position of the target parking position 2 in the fixed coordinate system in the storage device 19 will be described.

Note that in the following description, a target object stored in the storage device 19 is sometimes referred to as a "learned target object". Circular marks in FIG. 2 represent target object positions of learned target objects stored in the storage device 19.

Next, a parking assistance method performed by the parking assistance device 10 will be described with reference to FIG. 3. In order to use the parking assistance, the operation mode of the parking assistance device 10 is set to a "parking assistance mode".

In the parking assistance mode, the parking assistance device 10 retrieves the target object positions and the position of the target parking position 2 stored in the storage device 19. Circular marks in FIG. 3 represent target object positions of learned target objects retrieved from the storage device 19 in the parking assistance mode.

The parking assistance device 10 detects a relative position with respect to the own vehicle 1 of a target object around the own vehicle 1 as a target object position of the target object around the own vehicle 1 by the object sensor 12. A detection method of a target object position is the same as the detection method in the target object learning mode.

A target object position that the object sensor 12 detects in the parking assistance mode is indicated by a triangular mark. In the example in FIG. 3, corner portions of the lane boundary line 3a, the curbs 3c and 3e, and the wall 3g are detected as target object positions.

The parking assistance device 10 associates the same target object positions with each other by matching the respective target object positions detected by the object sensor 12 in the parking assistance mode (triangular marks) with the target object positions of the learned target objects retrieved from the storage device 19 (circular marks). For example, the parking assistance device 10 may determine target object positions having the same or similar feature amounts to be the same target object positions. Alternatively, regardless of feature amounts, the parking assistance device 10 may associate the target object positions detected by the object sensor 12 (triangular marks) with the target object position of the learned target objects retrieved from the storage device 19 (circular marks) by matching relative positional relationships between the target object positions detected by the object sensor 12 (triangular marks) with relative positional relationships between the target object positions of the learned target objects retrieved from the storage device 19 (circular marks). Still alternatively, the parking assistance device 10 may associate the target object positions detected by the object sensor 12 (triangular marks) with the target object positions of the learned target objects retrieved from the storage device 19 (circular marks), using both the above-described feature amounts of feature points and relative positional relationships. In the example in FIG. 3, corner portions of each of the lane boundary line 3a, the curbs 3c and 3e, and the wall 3g are associated with each other.

The parking assistance device 10 calculates, based on relative positional relationships between the target object positions detected in the parking assistance mode (triangular marks) and the own vehicle 1 and relative positional relationships between the target object positions of learned target objects (circular marks) associated with the feature points (triangular marks) and the target parking position 2, a relative position of the target parking position 2 with respect to the current position of the own vehicle 1.

For example, the parking assistance device 10 may calculate the position of the target parking position 2 in a relative coordinate system with reference to the current position of the own vehicle 1 (hereinafter, referred to as a "vehicle coordinate system"). Alternatively, the parking assistance device 10 may calculate, based on the relative positional relationships between the respective target object positions detected in the parking assistance mode (triangular marks) and the own vehicle 1 and the target object positions of the learned target objects in the fixed coordinate system (circular marks), the current position of the own vehicle 1 in the fixed coordinate system. The position of the own vehicle 1 and the position of the target parking position 2 in the fixed coordinate system being determined causes the relative position of the target parking position 2 with respect to the current position of the own vehicle 1 to be determined.

The parking assistance device 10 calculates, based on the relative position of the target parking position 2 with respect to the current position of the own vehicle 1, a target travel trajectory starting from the current position of the own vehicle 1 and reaching the target parking position 2. The parking assistance device 10 performs autonomous driving to control the own vehicle 1 to travel to the target parking position along the calculated target travel trajectory.

However, when a feature point of a target object is detected from an image as described above, the feature point detected from the image changes depending on an image capturing situation. For example, a feature point detected from an image changes depending on illuminance (the amount of light) and a direction of a light beam at the time of image capturing. In addition, depending on a seasonal difference in vegetation conditions, a feature point detected from an image (for example, a feature point detected from a hedge or a lawn) and the like change.

When an image capturing situation at a time point at which a target object position of a learned target object was detected in the past and an image capturing situation at a time point at which the parking assistance is used are largely different from each other, there is a risk that the number of target object positions of learned target objects (circular marks) that can be associated with target object positions detected at the time point at which the parking assistance is used (triangular marks) decreases, detection precision of the relative position of the target parking position 2 with respect to the current position of the own vehicle 1 deteriorates, and precision of the parking assistance deteriorate.

Therefore, the parking assistance device 10 of the embodiment, when performing the parking assistance of the own vehicle 1 at a target parking position, not only detects a target object position around the own vehicle 1 from an image acquired by capturing the surroundings of the own vehicle 1 but also detects an image capturing situation (in the following description, sometimes referred to as "the first image capturing situation") when the image is captured.

In addition, the parking assistance device 10 stores one or more combinations of an image capturing situation (in the following description, sometimes referred to as "the second image capturing situation") when an image from which a learned target object was detected was captured in the past (hereinafter, sometimes referred to as a "past image") and a relative positional relationship between the learned target object detected from the past image and the target parking position 2, in the storage device 19 as parking assistance data 20.

Figure 4:
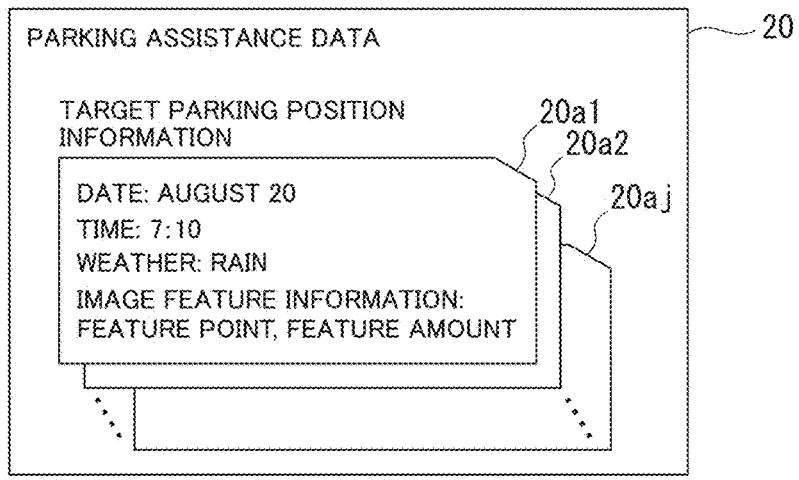
FIG. 4 is an explanatory diagram of a first example of parking assistance data.

FIG. 4 is an explanatory diagram of a first example of the parking assistance data 20. The parking assistance data 20 in FIG. 4 include j sets of parking assistance data 20a1 to 20aj.

Each of the sets of parking assistance data 20a1 to 20aj is a combination of one of a plurality of different second image capturing situations and the target object position of a learned target object that is detected from one of images each of which is captured in one of the second image capturing situations.

For example, each of the sets of parking assistance data 20a1 to 20aj includes information about a date, time, and weather at the time of image capturing as the second image capturing situation. Each of the sets of parking assistance data 20a1 to 20aj also includes image feature information about a feature point of a learned target object (a position and feature amount of a feature point in the fixed coordinate system) as target object positions of learned target objects.

In addition, the parking assistance data 20 include position information about the target parking position 2 in the fixed coordinate system.

The parking assistance device 10 selects, from among the sets of parking assistance data 20a1 to 20aj, the target object position of a learned target object combined with the second image capturing situation having a difference from the first image capturing situation less than or equal to a predetermined difference and calculates, based on a relative positional relationship between the selected learned target object and the target parking position 2 and the target object position of a target object detected around the own vehicle 1, the relative position of the target parking position 2 with respect to the current position of the own vehicle 1.

By selecting a learned target object that is detected from an image captured in the second image capturing situation having a difference from the first image capturing situation less than or equal to the predetermined difference as described above, it becomes possible to select and use a learned target object that is detected from an image captured in an image capturing situation close (similar) to the first image capturing situation at the time point at which the parking assistance of the own vehicle 1 at the target parking position is performed.

Since as a result, the number of target object positions of learned target objects (circular marks) that can be associated with target object positions detected when the parking assistance is performed (triangular marks) can be prevented from decreasing, it is possible to suppress reduction in precision of the parking assistance.

Note that the parking assistance data 20 may be stored in the storage device 19 with respect to a plurality of different target parking positions.

Figure 5:
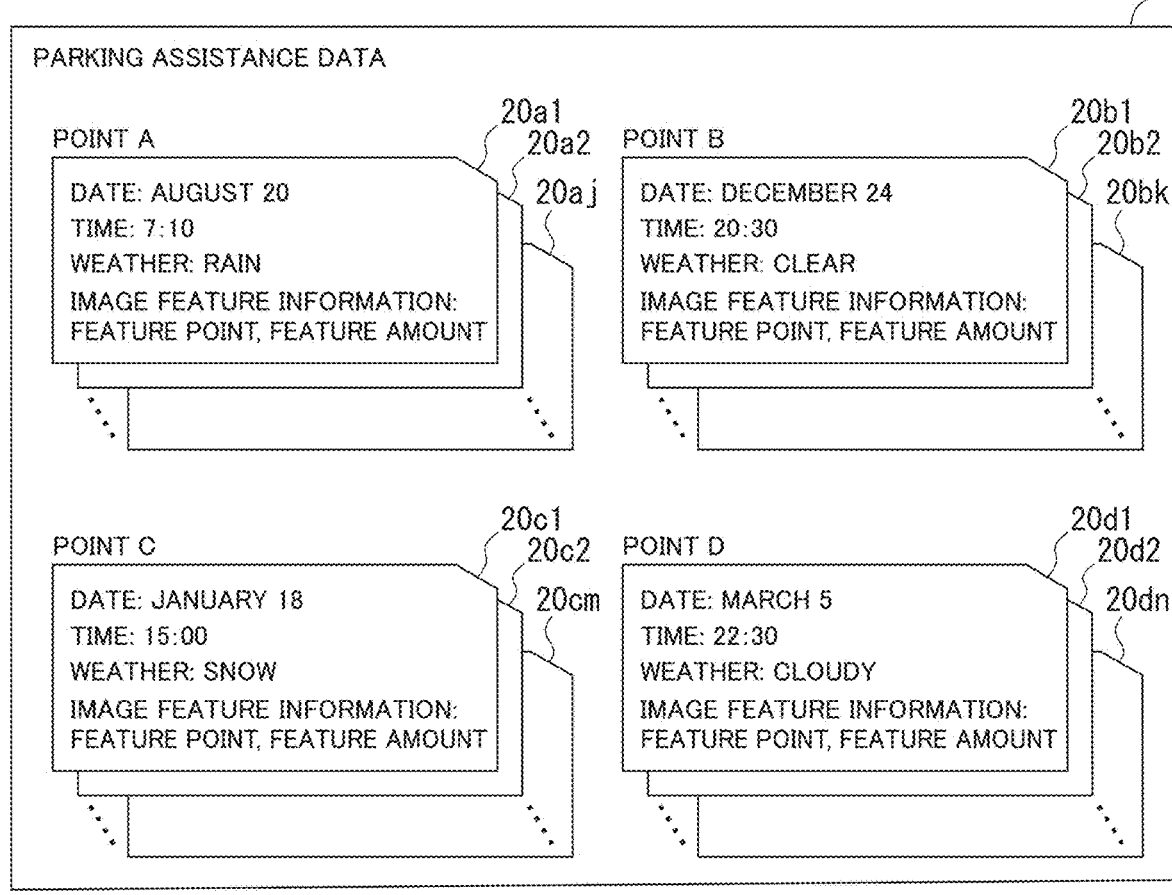
FIG. 5 is an explanatory diagram of a second example of the parking assistance data.

FIG. 5 is an explanatory diagram of the second example of the parking assistance data 20. The parking assistance data 20 in FIG. 5 include, with respect to points A to D that are different target parking positions, a group of j sets of parking assistance data 20a1 to 20aj, a group of k sets of parking assistance data 20b1 to 20bk, a group of m sets of parking assistance data 20c1 to 20cm, and a group of n sets of parking assistance data 20d1 to 20dn, respectively.

Each of the sets of parking assistance data 20a1 to 20aj is a combination of one of a plurality of different second image capturing situations and the target object position of a learned target object that is detected from one of images each of which is captured around a target parking position at the point A in one of the second image capturing situations. Each of the sets of parking assistance data 20b1 to 20bk is a combination of one of a plurality of different second image capturing situations and the target object position of a learned target object that is detected from one of images each of which is captured around a target parking position at the point B in one of the second image capturing situations.

Each of the sets parking assistance data 20*c*1 to 20*cm* is a combination of one of a plurality of different second image capturing situations and the target object position of a learned target object that is detected from one of images each of which is captured around a target parking position at the point C in one of the second image capturing situations. Each of the sets of parking assistance data 20*d*1 to 20*dn* is a combination of one of a plurality of different second image capturing situations and the target object position of a learned target object that is detected from one of images each of which is captured around a target parking position at the point D in one of the second image capturing situations.

In the parking assistance mode, the parking assistance device 10 selects and retrieves a group of sets of the parking assistance data 20 stored with respect to a target parking position at which the own vehicle 1 is to be parked among the plurality of points A to D.

For example, the parking assistance device 10 may retrieve a group of sets of the parking assistance data 20 corresponding to the current position of the own vehicle 1 measured by the positioning device 11. For example, the parking assistance device 10 may retrieve a group of sets of parking assistance data that is stored with respect to a target parking position closest to the current position of the own vehicle 1. In addition, the parking assistance device 10 may store attribute data (for example, "a parking space of an own house" or "a parking space of a workplace") of each group of sets of the parking assistance data 20 in the storage device 19, and a passenger (for example, a driver) may select a group of sets of parking assistance data, based on the attribute data.

Note that in place of saving the parking assistance data 20 in the storage device 19, the parking assistance device 10 may save the parking assistance data 20 in an external server device and transmit and receive the parking assistance data 20 via the communication device 14.

Figure 6:
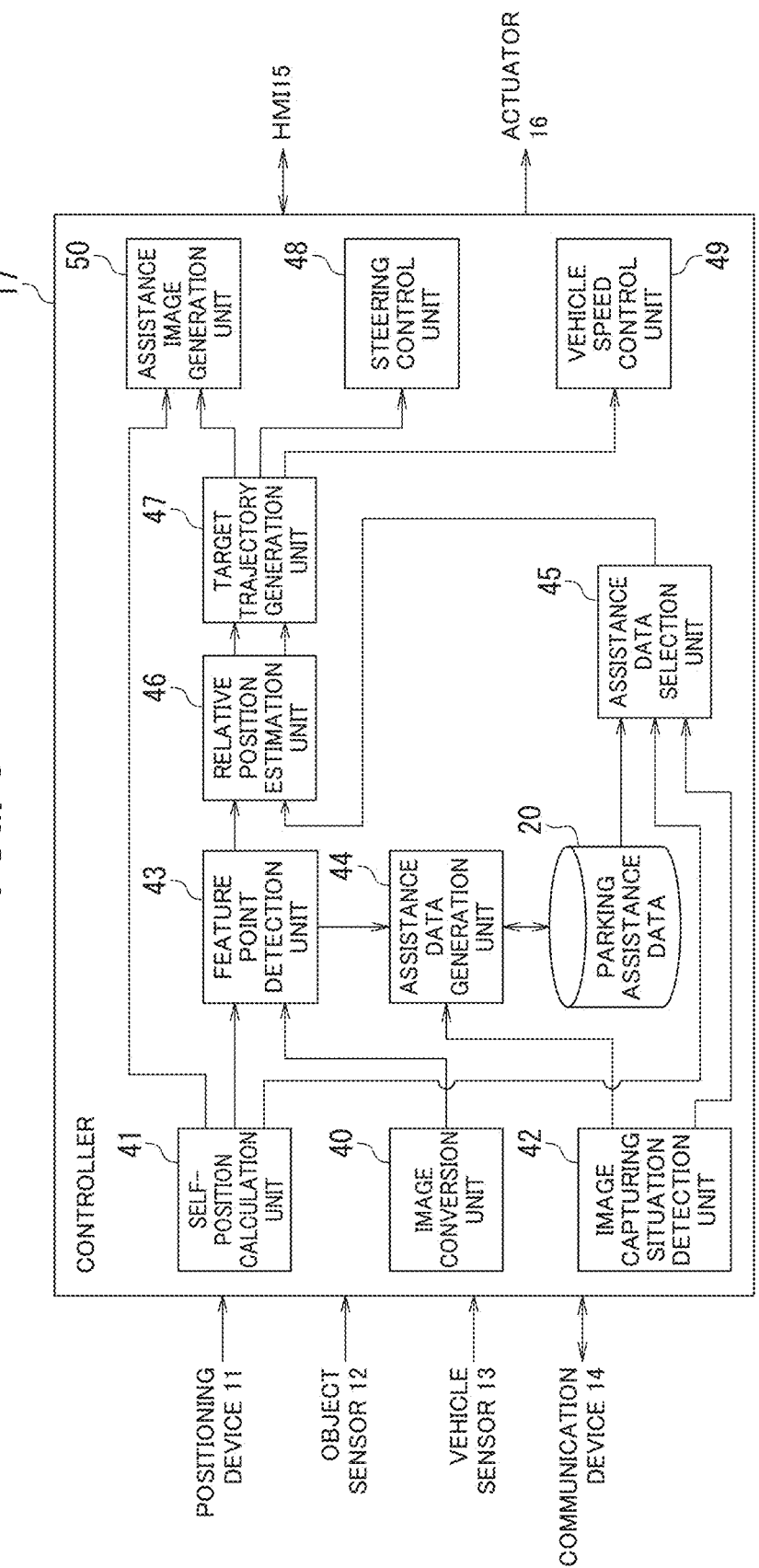
FIG. 6 is a block diagram of an example of a functional configuration of a controller in FIG. 1.

A functional configuration of the controller 17 will be described in more detail below. FIG. 6 is now referred to. The controller 17 functions as an image conversion unit 40, a self-position calculation unit 41, an image capturing situation detection unit 42, a feature point detection unit 43, an assistance data generation unit 44, an assistance data selection unit 45, a relative position estimation unit 46, a target trajectory generation unit 47, a steering control unit 48, a vehicle speed control unit 49, and an assistance image generation unit 50.

Figure 3:
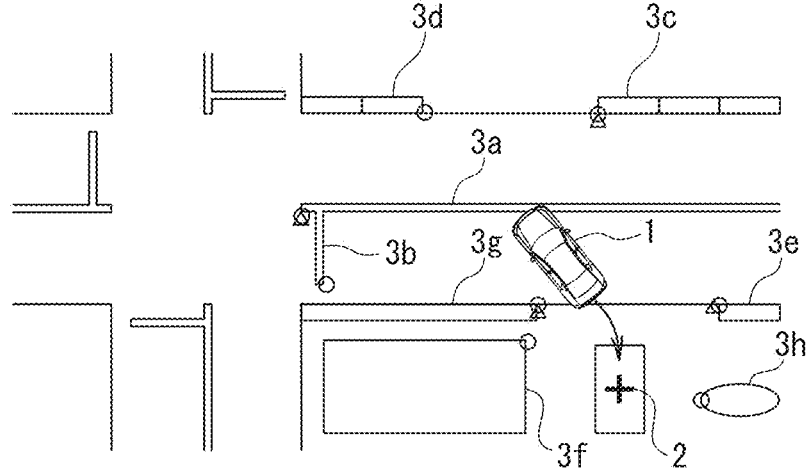
FIG. 3 is an explanatory diagram of an example of a parking assistance method.

The image conversion unit 40 converts captured images captured by the camera of the object sensor 12 to a bird's eye image (an around view monitoring image) that is an image viewed from a virtual viewpoint directly above the own vehicle 1 as illustrated in FIGS. 2 and 3. Hereinafter, a bird's eye image after conversion by the image conversion unit 40 is sometimes referred to as a "surrounding image".

The self-position calculation unit 41 calculates a current position of the own vehicle 1 in the fixed coordinate system by dead reckoning or the like based on vehicle information output from the vehicle sensors 13. The self-position calculation unit 41 may correct the calculated current position by map mapping or the like between a target object position detected by the object sensor 12 and a known target object position or the high-definition map information.

The feature point detection unit 43 detects a feature point of a target object around the own vehicle 1 from the surrounding image output from the image conversion unit 40 and calculates a feature amount of the feature point. The feature point detection unit 43 outputs the detected feature point and the feature amount of the feature point to the assistance data generation unit 44 and the relative position estimation unit 46 in conjunction with the current position of the own vehicle 1 received from the self-position calculation unit 41.

The image capturing situation detection unit 42 detects an image capturing situation of the camera of the object sensor 12 at a time point of capturing an image from which the feature point detection unit 43 detects a feature point. The image capturing situation detection unit 42 may include a clock configured to detect a time or a date and time of an image capturing time point as an image capturing situation. The image capturing situation detection unit 42 may acquire information about weather at the current position of the own vehicle 1 as an image capturing situation. The image capturing situation detection unit 42 may acquire the information about weather from an external device by the communication device 14.

In addition, the image capturing situation detection unit 42 may detect brightness (illuminance) at the current position of the own vehicle 1 as an image capturing situation by the camera or another sensor of the object sensor 12. In addition, the image capturing situation detection unit 42 may calculate a solar position at an image capturing position, based on the date and time of the image capturing time point and define the calculated solar position as an image capturing situation.

The image capturing situation detection unit 42 outputs the detected information about an image capturing situation to the assistance data selection unit 45 and the assistance data generation unit 44. The image capturing situation output to the assistance data selection unit 45 are used as the first image capturing situation. The image capturing situation output to the assistance data generation unit 44 are used as the second image capturing situation.

The assistance data generation unit 44 calculates, based on a feature point output from the feature point detection unit 43 and the current position of the own vehicle 1, a position of the feature point in the fixed coordinate system. The assistance data generation unit 44 combines image feature information including the calculated position of a feature point and feature amount information and the second image capturing situation output from the image capturing situation detection unit 42 and stores the combined data in the storage device 19 as the parking assistance data 20.

When the current position of the own vehicle 1 reaches the target parking position 2, the assistance data generation unit 44 receives the current position of the own vehicle 1 in the fixed coordinate system from the positioning device 11 or the self-position calculation unit 41 as the target parking position 2 and stores the target parking position 2 in the storage device 19 as the parking assistance data 20.

Note that the assistance data generation unit 44 may not only generate the parking assistance data 20 from a feature point detected while the own vehicle 1 is manually moved to be parked at the target parking position 2 in the target object learning mode but also generate the parking assistance data 20 from a feature point detected while subsequently the own vehicle 1 is moved to be parked at the target parking position 2 in the parking assistance mode. Because of this configuration, it becomes easier to generate the parking assistance data 20 in different image capturing situations.

Next, when the parking assistance of the own vehicle 1 at a target parking position is performed in the parking assistance mode, the assistance data selection unit 45 acquires the current position of the own vehicle 1 from the self-position calculation unit 41. The assistance data selection unit 45 retrieves, among groups of sets of the parking assistance data 20 that are stored with respect to target parking positions at a plurality of points (for example, the points A to D in FIG. 5), a group of sets of the parking assistance data 20 corresponding to the current position from the storage device 19. Herein, a case where the sets of parking assistance data 20a1 to 20aj of the point A are retrieved will be described.

The assistance data selection unit 45, by comparing the second image capturing situations included in the sets of parking assistance data 20a1 to 20aj of the point A with the first image capturing situation output from the image capturing situation detection unit 42, calculates differences between the first image capturing situation and the second image capturing situations.

For example, the assistance data selection unit 45 may calculate a difference between variables (for example, an image capturing time, brightness, and a solar position) representing the first image capturing situation and second image capturing situation as a difference between the first image capturing situation and the second image capturing situation. In addition, when weather (such as clear weather, cloudiness, rain, and snow) is used as the variables representing the first image capturing situation and the second image capturing situation, the assistance data selection unit 45 may assign a corresponding value corresponding to each type of weather (for example, a value "0" is assigned to clear weather, a value "0.4" is assigned to cloudiness, a value "1" is assigned to rain, and a value "1.2" is assigned to snow) to a value of each of the variables and calculate a difference between the corresponding values as a difference between the first image capturing situation and the second image capturing situation.

In addition, the assistance data selection unit 45 may individually derive corresponding values corresponding to the variables representing the first image capturing situation and the second image capturing situation, using a function, a map, or a look-up table, and calculate a difference between the corresponding values as a difference between the first image capturing situation and the second image capturing situation.

For example, the assistance data selection unit 45 may individually derive a corresponding value corresponding to an image capturing date and time of the first image capturing situation and a corresponding value corresponding to an image capturing date and time of the second image capturing situation, and calculate a difference between the corresponding values as a difference between the first image capturing situation and the second image capturing situation. As a corresponding value corresponding to an image capturing date and time, the assistance data selection unit 45 may derive, for example, binary information that distinguishes whether the image capturing time is within a daytime or a nighttime with respect to each image capturing date or may derive an estimated value of brightness at the image capturing date and time.

The assistance data selection unit 45 may derive a corresponding value for each combination of an image capturing date and time and weather, using a function, a map, or a look-up table, and calculate a difference between the corresponding values as a difference between the first image capturing situation and the second image capturing situation. In addition, for example, the assistance data selection unit 45 may separately calculate a corresponding value corresponding to an image capturing date and time and a corresponding value corresponding to weather, and calculate a difference between weighted sums of the corresponding values as a difference between the first image capturing situation and the second image capturing situation.

The assistance data selection unit 45 selects, from among the sets of parking assistance data 20a1 to 20aj of the point A, image feature information of a feature point of a learned target object combined with the second image capturing situation having a difference from the first image capturing situation less than or equal to the predetermined difference.

A difference between the first image capturing situation and the second image capturing situation being less than or equal to the predetermined difference may, for example, mean that the difference between the first image capturing situation and the second image capturing situation is less than or equal to a predetermined value or that the difference between the first image capturing situation and the second image capturing situation is smallest.

In addition, when all the differences between the first image capturing situation and the second image capturing situations are larger than the predetermined value, the assistance data selection unit 45 may select image feature information that is combined with the second image capturing situation having a smallest difference from the first image capturing situation.

In addition, when among the sets of parking assistance data 20a1 to 20aj of the point A, a plurality of sets of parking assistance data having a difference between the first image capturing situation and the second image capturing situation less than or equal to the predetermined difference exist, the assistance data selection unit 45 may select, among the plurality of sets of parking assistance data, a set of parking assistance data including image feature information of a largest number of feature points.

The assistance data selection unit 45 outputs the selected image feature information and information about the target parking position 2 corresponding to the current position of the own vehicle 1 to the relative position estimation unit 46.

The relative position estimation unit 46, by matching the target object positions of learned target objects indicated by the image feature information output from the assistance data selection unit 45 (circular marks in FIG. 3) with target object positions indicated by feature points output from the feature point detection unit 43 in the parking assistance mode (triangular marks in FIG. 3), associates pieces of feature point information detected with respected to the same target object with each other.

The relative position estimation unit 46 estimates, based on relative positional relationships between the target object positions detected in the parking assistance mode (triangular marks) and the own vehicle 1 and relative positional relationships between feature point information of learned target objects (circular marks) associated with the feature points (triangular marks) and the target parking position 2, a relative position of the target parking position 2 with respect to the current position of the own vehicle 1.

For example, target object positions detected in the parking assistance mode are denoted by $(x_i, y_i)$, and target object positions of learned target objects each of which is associated with one of the target object positions $(x_i, y_i)$ are denoted by $(x_{mi}, y_{mi})$ (i=1 to N). For example, the relative position estimation unit 46 may calculate an affine transformation matrix $M_{affine}$, using the following equation, based on a least-square method.

$$\begin{bmatrix} a_1 \\ a_2 \\ a_3 \\ a_4 \end{bmatrix} = [X_X^T X_X]^{-1} X_X^T X_{tfm} \quad \text{[Math 1]}$$

-continued where $$X_X = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix}$$

$$X_{tfm} = \begin{bmatrix} x_1 \\ y_1 \\ \vdots \\ x_N \\ y_N \end{bmatrix}$$

$$M_{affine} = \begin{bmatrix} a_1 & a_2 & a_3 \\ -a_2 & a_1 & a_4 \end{bmatrix}$$

The relative position estimation unit 46 may calculate a column vector $(a_1, a_2, a_3, a_4)^T$ as in the following equation, using a least-square method.

$$W = \mathrm{diag}(w_1 \ldots w_N) \quad \text{[Math 2]}$$

$$\begin{bmatrix} a_1 \\ a_2 \\ a_3 \\ a_4 \end{bmatrix} = [X_X^T W X_X]^{-1} X_X^T X_{tfm}$$

The relative position estimation unit 46 converts a position (targetx$_m$, targety$_m$) of the target parking position 2 in the fixed coordinate system that is included in the parking assistance data 20 to a position (targetx, targety) in the vehicle coordinate system, using the following equation.

$$\begin{Bmatrix} targetx \\ targety \end{Bmatrix} = M_{affine} \begin{Bmatrix} targetx_m \\ targety_m \\ 1 \end{Bmatrix} \quad \text{[Math 3]}$$

The target trajectory generation unit 47 generates a target travel trajectory starting from the current position of the own vehicle 1 in the vehicle coordinate system (that is, the coordinate origin) and reaching the position (targetx, targety) of the target parking position 2 in the vehicle coordinate system.

Although a well-known method employed in an autonomous parking device that has already generally been known can be applied to calculation of a target travel trajectory starting from the current position of the own vehicle 1 and reaching the target parking position 2, a target travel trajectory can be calculated by, for example, connecting a clothoid curve from the current position of the own vehicle 1 to the target parking position 2, as an example. When the target travel trajectory includes a turning-back point, the target travel trajectory can be calculated by, for example, connecting clothoid curves from the current position of the own vehicle to the turning-back point, and from the turning-back point to the target parking position 2 in turn.

In addition, the target trajectory generation unit 47 calculates a target vehicle speed profile in which movement speed at each position on the target travel trajectory from the current position of the own vehicle to the target parking position 2 is set. For example, the target vehicle speed profile causes the own vehicle 1 to basically travel at a predetermined prescribed set speed, and a vehicle speed profile that causes the own vehicle 1 to accelerate to the set speed from the current position of the own vehicle 1 and subsequently come to a stop at the target parking position 2 can be calculated. When the target travel trajectory includes a turning-back point, the target trajectory generation unit 47 may calculate a vehicle speed profile that causes the own vehicle 1 to decelerate before the turning-back point and stop at the turning-back point, accelerate to the set speed from the turning-back point, and decelerate before the target parking position 2 and stop at the target parking position 2. The target trajectory generation unit 47 may set a set speed in the calculation of a speed profile, based on curvature of the calculated target travel trajectory in such a manner that the larger the curvature is, the lower the speed becomes.

The steering control unit 48 controls the steering actuator in the actuators 16 in such a way that the own vehicle 1 travels along the target travel trajectory.

In addition, the vehicle speed control unit 49 controls the accelerator actuator and the brake actuator in the actuators 16 in such a way that the vehicle speed of the own vehicle 1 changes in accordance with the movement speed plan that the target trajectory generation unit 47 calculated. Because of this configuration, the own vehicle 1 is controlled to travel along the target travel trajectory.

The assistance image generation unit 50 generates a parking assistance image that represents the target travel trajectory calculated by the target trajectory generation unit 47 and the current position of the own vehicle 1. For example, the parking assistance image may be an image obtained by superimposing the target travel trajectory and the current position of the own vehicle 1 on a bird's eye view or an aerial view in which the surroundings of the own vehicle 1 is viewed from above. The assistance image generation unit 50 displays the parking assistance image on the display device in the human-machine interfaces 15.

(Operation)

FIG. 7 is a flowchart of an example of operation of the parking assistance device 10 in the parking assistance mode.

In step S1, the positioning device 11 measures a current position of the own vehicle 1 in the fixed coordinate system.

In step S2, the feature point detection unit 43 of the controller 17 detects a target object position of a target object (a feature point) around the own vehicle 1.

In step S3, the image capturing situation detection unit 42 detects an image capturing situation by the camera of the object sensor 12 around the own vehicle 1 as the first image capturing situation.

In step S4, the assistance data selection unit 45 retrieves sets of the parking assistance data 20 corresponding to the current position of the own vehicle 1 from the storage device 19.

In step S5, the assistance data selection unit 45 selects, from among the sets of the parking assistance data 20 retrieved in step S4, a set/sets of the parking assistance data 20 having a difference between the first image capturing situation detected in step S3 and the second image capturing situation that is less than or equal to a predetermined difference.

In step S6, the assistance data selection unit 45 selects, from among the sets of the parking assistance data 20 selected in step S5, a set of data that includes a largest number of feature points.

In step S7, the relative position estimation unit 46 estimates, based on the target object position detected in step S2 and the set of the parking assistance data 20 selected in step S6, a relative position of the target parking position 2 with respect to the own vehicle 1.

In step S8, the target trajectory generation unit 47 generates, based on the relative position of the target parking position 2 with respect to the own vehicle 1, a target travel trajectory that the own vehicle is caused to travel from the current position of the own vehicle 1 to the target parking position 2 and a target vehicle speed profile.

In step S9, the steering control unit 48 controls a steering angle in such a way that the own vehicle 1 travels along the target travel trajectory. The vehicle speed control unit 49 controls movement speed of the own vehicle 1 in accordance with the target vehicle speed profile. When the own vehicle 1 reaches the target parking position 2, the process terminates.

(Advantageous Effects of Embodiment)

(1) The controller 17: detects, from an image acquired by capturing surroundings of the own vehicle 1, a first target object position that is a position of a target object around the own vehicle 1; detects a first image capturing situation that is an image capturing situation when the image is captured; with respect to a second target object position that is a target object position of a target object detected from a past image that is an image acquired by capturing surroundings of a target parking position in the past, retrieves, from the storage device 19 in which one or more combinations of a relative positional relationship between the second target object position and the target parking position and a second image capturing situation that is an image capturing situation when the past image is captured are stored, one or more combinations of a relative positional relationship and the second image capturing situation; selects, among the retrieved relative positional relationships, a relative positional relationship that is stored in combination with the second image capturing situation having a difference from the first image capturing situation less than or equal to a predetermined difference; and calculates, based on the selected relative positional relationship and the target object position of a target object stored around the own vehicle 1, a relative position between the current position of the own vehicle 1 and the target parking position and performs parking assistance of the own vehicle 1 at the target parking position.

Because of this configuration, it is possible to: detect a target object from an image in which the surroundings of the target parking position are captured and store a relative positional relationship between the target parking position and the target object position in advance; at the time of subsequent parking assistance, detect a target object position from an image in which the surroundings of the own vehicle 1 are captured; and when by associating a detected target object position with a pre-stored target object position, a relative position between the current position of the own vehicle 1 and the target parking position is calculated, by associating a target object position detected from an image captured in the second image capturing situation that is close (similar) to the first image capturing situation that is an image capturing situation at the time of parking assistance with a target object position detected at the time of parking assistance, calculate a relative position between the current position of the own vehicle 1 and the target parking position. Since as a result, the number of target object positions that can be associated can be prevented from decreasing due to a change in an image capturing environment, it is possible to suppress reduction in precision of the parking assistance.

(2) The controller 17 may select, among relative positional relationships stored in the storage device, a relative positional relationship stored in combination with the second image capturing situation having a smallest difference from the first image capturing situation, as a selected relative positional relationship.

Because of this configuration, it is possible to, by associating a target object position that is detected from an image captured in the second image capturing situation that is closest (most similar) to the first image capturing situation with a target object position detected at the time of parking assistance, calculate the relative position between the current position of the own vehicle 1 and the target parking position.

(3) The first image capturing situation and the second image capturing situation may include at least one of brightness or weather at an image capturing point, an image capturing time, an image capturing date and time, and a solar position at the time of image capturing.

Because of this configuration, it is possible to calculate a difference between the first image capturing situation and the second image capturing situation, based on a factor influencing detection of a target object position.

(4) The controller 17 may calculate a target travel trajectory from the current position of the own vehicle 1 to the target parking position, based on a relative positional relationship between the current position of the own vehicle 1 and the target parking position and control the own vehicle 1 to travel along the target travel trajectory from the current position of the own vehicle 1 to the target parking position.

Because of this configuration, parking assistance to control the own vehicle in such a way that the own vehicle 1 travels to the target parking position 2 can be achieved.

(5) The controller 17 may calculate a target travel trajectory from the current position of the own vehicle 1 to the target parking position, based on a relative positional relationship between the current position of the own vehicle 1 and the target parking position and display the target travel trajectory and the position of the own vehicle 1 on a display device that a passenger can visually recognize.

Because of this configuration, the passenger can visually recognize a target travel trajectory that the own vehicle 1 is caused to travel to the target parking position 2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Parking assistance device
11 Positioning device
12 Object sensor
13 Vehicle sensor
14 Communication device
15 Human-machine interface
16 Actuator
17 Controller
18 Processor
19 Storage device
40 Image conversion unit
41 Self-position calculation unit
42 Image capturing situation detection unit
43 Feature point detection unit 44 Assistance data generation unit
45 Assistance data selection unit
46 Relative position estimation unit
47 Target trajectory generation unit
48 Steering control unit
49 Vehicle speed control unit
50 Assistance image generation unit

The invention claimed is:

1. A parking assistance method comprising:
detecting, from an image acquired by capturing surroundings of an own vehicle, a first target object position, the first target object position being a position of a target object around the own vehicle;
detecting a first image capturing situation, the first image capturing situation being an image capturing situation when the image is captured;
with respect to a second target object position, the second target object position being a target object position of a target object detected from a past image, the past image being an image acquired by capturing surroundings of a target parking position in a past, retrieving, from a predetermined storage device in which one or more combinations of a relative positional relationship between the second target object position and the target parking position and a second image capturing situation, the second image capturing situation being an image capturing situation when the past image is captured, are stored, one or more combinations of the relative positional relationship and the second image capturing situation;
selecting, among retrieved relative positional relationships, the relative positional relationship stored in combination with the second image capturing situation having a difference from the first image capturing situation less than or equal to a predetermined difference; and
calculating, based on a selected relative positional relationship and the first target object position, a relative position between a current position of the own vehicle and the target parking position and performing parking assistance of the own vehicle at the target parking position.

2. The parking assistance method according to claim 1, further comprising selecting, among the retrieved relative positional relationships, the relative positional relationship stored in combination with the second image capturing situation having a smallest difference from the first image capturing situation as the selected relative positional relationship.

3. The parking assistance method according to claim 1, wherein the first image capturing situation and the second image capturing situation include at least one of brightness or weather at an image capturing point, an image capturing time, an image capturing date and time, and a solar position at a time of image capturing.

4. The parking assistance method according to claim 1, further comprising:
calculating, based on a relative positional relationship between a current position of the own vehicle and the target parking position, a target travel trajectory from a current position of the own vehicle to the target parking position; and
controlling the own vehicle to travel along the target travel trajectory from a current position of the own vehicle to the target parking position.

5. The parking assistance method according to claim 1, further comprising:
calculating, based on a relative positional relationship between a current position of the own vehicle and the target parking position, a target travel trajectory from a current position of the own vehicle to the target parking position; and
displaying the target travel trajectory and a position of the own vehicle on a display device, the display device being visually recognizable by a passenger.

6. A parking assistance device comprising:
an image capturing device configured to capture surroundings of an own vehicle; and
a controller configured to:
detect a first target object position, the first target object position being a position of a target object around the own vehicle, from an image generated by the image capturing device;
detect a first image capturing situation, the first image capturing situation being an image capturing situation when the image is captured;
with respect to a second target object position, the second target object position being a target object position of a target object detected from a past image, the past image being an image acquired by capturing surroundings of a target parking position in a past, retrieve, from a predetermined storage device in which one or more combinations of a relative positional relationship between the second target object position and the target parking position and a second image capturing situation, the second image capturing situation being image capturing situation when the past image is captured, are stored, one or more combinations of the relative positional relationship and the second image capturing situation;
select, among retrieved relative positional relationships, the relative positional relationship stored in combination with the second image capturing situation having a difference from the first image capturing situation less than or equal to a predetermined difference;
calculate, based on a selected relative positional relationship and the first target object position, a relative position between a current position of the own vehicle and the target parking position; and
perform parking assistance of the own vehicle at the target parking position.

* * * * *